3,445,249
COMPOSITIONS CONTAINING ORGANOTIN METAL CARBOXYLATE ANTIMICROBIALS

John R. Leebrick, Old Lyme, Conn., assignor to Chas. Pfizer & Co., Inc., New York, N.Y., a corporation of Delaware
No Drawing. Original application Feb. 11, 1965, Ser. No. 431,996. Divided and this application Oct. 30, 1967, Ser. No. 679,183
Int. Cl. C09k 3/18; C09d 5/16
U.S. Cl. 106—15                                    5 Claims

ABSTRACT OF THE DISCLOSURE

Plastic, paint, wax and adhesive compositions stabilized against microbial attack by incorporating a biocidal amount of a novel organotin metal carboxylate.

---

The instant application is a division of copending application Ser. No. 431,996, filed Feb. 11, 1965 and now U.S. Patent 3,382,264.

This invention relates to novel antimicrobial agents. More particularly, it is concerned with metal salts of organotin derivatives containing carboxyl groups. These new compounds which contain both tin and a second metal are organometallic biocides exhibiting broad spectrum activity against a number of microorganisms. This invention also contemplates compositions stabilized against microbial attack, which contain the instant biocides.

The biocides contemplated by this invention are the compounds prepared by:

(a) Heating, at esterification temperature, an organotin carbinol of the formula $$[R]_3Sn\text{—}G\text{—}R'\text{—}OH$$

wherein R is a hydrocarbon substituent selected from the group consisting of alkyl, alkenyl, alkynyl, cycloalkyl, cycloalkenyl, aryl and alkaryl of up to 18 carbon atoms; G is selected from the group consisting of divalent radicals of the formula —S— and

and R' is a hydrocarbon substituent selected from the group consisting of alkylene, alkenylene, alkynylene, cycloalkylene, cycloalkenylene, arylene, and alkarylene of up to 18 carbon atoms, with at least an equimolar amount of a compound selected from the group consisting of those of the formula

and anhydrides thereof until formation of an ester linkage is substantially complete, at least one free carboxyl group per molecule remaining, and (b) Heating the organotin carboxylic acid formed in step (a) with at least an equimolar amount of a carboxylate-forming cation-containing reagent selected from the group consisting of those of the formulas $CdW_2$; $AgX$; $CuX$; $CuX_2$; $[R]_mHg[Y]_n$, $m$ being 0, 1, $n$ being 1, 2; $[R]_mBi[Y]_n$, $[R]_mSb[Y]_n$ and $[R]_mAs[Y]_n$, $m$ being 1, 2, 3, $n$ being 0, 1, 2, 3, 4; $[R]_mSn[Y]_n$ and $[R]_mGe[Y]_n$, $m$ being 0, 1, 2, 3, $n$ being 1, 2, 3, 4; and $[R]_mPb[Z]_n$, $m$ being 0, 1, 2, 3, 4, $n$ being 0, 1, 2, 3, 4, the sum of $m$ and $n$ being equal to the valency state of the cation, wherein W is a halide selected from the group consisting of chloride, bromide and iodide; X is an anion selected from the group consisting of —OH, [—O—]½,

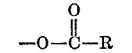

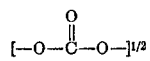

and —OR; Y is an anion selected from the group consisting of those designated X and W; and Z is an anion selected from the group consisting of Y and

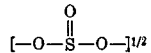

and wherein R is as aforesaid, at a temperature of from about 20° C. to about 150° C. until carboxylate formation is substantially complete. The divalent radical R' is contemplated to include radicals such as 1,1-propylene (both linking bonds on the same carbon atom) as well as 1,3-propylene (both linking bonds on different carbon atoms). Of course, as will be obvious to one skilled in the art, the formula for the organotin carbinol previously described $[R]_3Sn\text{—}G\text{—}R'\text{—}OH$ does not intend to encompass compounds wherein the terminal —OH or G when G is —S— are bonded directly to an unsaturated carbon atom in those instances when R' is alkenylene, alkynylene or cycloalkenylene.

These new compounds exhibit antimicrobial activity against a number of microorganisms. They are synergistic over mechanical mixtures of organometallic compounds containing the same ratios of first to second metal. They are useful in the treatment of water, as in cooling towers, as preservatives for plastics, adhesives and textiles, as turf fungicides, as paint mildewcides, in marine anti-fouling coatings and as sanitizers, especially for wax compositions.

Special mention is made of an embodiment of this invention contemplating a highly active biocide prepared by:

(a) Heating tributyltin hydroxyacetate, at esterification temperature, with at least an equimolar amount of maleic anhydride until the formation of an ester linkage is substantially complete, one free carboxyl group per molecule remaining; and (b) Heating the organotin carboxylic acid with at least an equimolar amount of phenylmercuric hydroxide at about 100° C. until carboxylate formation is substantially complete. This compound is particularly useful as a paint mildewcide in oil-base and water-base formulations and is found to control the growth of fungi very effectively in plasticized polyvinyl chloride. It is found to be relatively less toxic to mammals than is phenylmercuric acetate.

In addition, this invention contemplates, in one of its embodiments, a biocide prepared by:

(a) Heating, at esterification temperature, tributyltin β-hydroyethyl mercaptide with at least an equimolar amount of maleic anhydride until the formation of an ester linkage is substantially complete, one free carboxyl group per molecule remaining; and (b) Heating the organotin carboxylic acid with at least an equimolar amount of phenylmercuric hydroxide at about 100° C. until carboxylate formation is substantially complete. This sulfur-containing compound is characterized by high antimicrobial activity, even when used at low concentrations.

The structures of the valuable new compounds have not been clearly established at this time. Therefore, for purposes of the detailed description herein and for the appended claims, the instant biocides will be characterized by the process employed in their preparation.

The starting materials are readily available or can be easily prepared. One convenient method comprises (a) reaction of a bis-triorganotin oxide with a mercapto alcohol or a hydroxy carboxylic acid according to the following sequence:

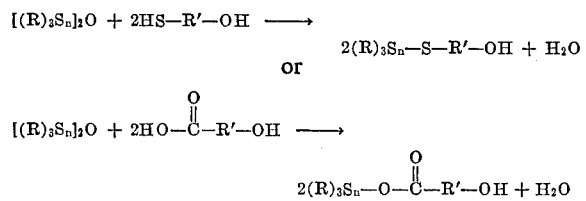

In either case, a bond forms between tin and the sulfur atom or a carboxyl oxygen, water being eliminated as a reaction product. The reaction is driven to completion simply by heating the reactants together for a period long enough for the water to be driven off. It is convenient to heat the reactants at a temperature above the boiling point of water; 120° C. has been found to be especially effective. Of course, obvious chemical equivalents of this technique can be used.

The organotins and carbinols are freely available commercially or can be obtained by methods well known to those skilled in the art. Illustrative of a commercially available tin-containing starting material is bis-tributyltin oxide. Generally, to prepare tin-containing starting materials with varying R groups, it is convenient to use a modification of the classical Grignard procedure; leading references for this are cited in H. V. Smith, "Organotin Stabilizers," Tin Research Institute, Middlesex, England, page 5 (1959). Illustrative of the R groups introduced in this manner are methyl, ethyl, propyl, butyl, octyl, phenyl, benzyl, ortho-tolyl, cyclopentadienyl, octadecyl, 2-ethylhexyl, ethynyl, cyclohexyl, cyclohexenyl, and the like.

The mercapto alcohols used as starting materials are available commercially or can be prepared readily. Especially useful in preparing the organotin mercaptides are mercaptoalcohols of the formula HS—R'—OH wherein R' is methylene, ethylene, hexylene, octadecylene, hexadecylethylene, 2-butylenylene 2-methyl-2-butylenylene, 2 - butynylene, cyclohexylene, cyclohexenylene, phenylene, tolylene, naphthylene, and the like.

The hydroxycarboxylic acids used to make the organotin carboxylates are freely available commercially or can be readily prepared. For example, hydroxyacetic acid is an article of commerce. Illustrative of other hydroxy acids useful to prepare the new compounds are those of the formula

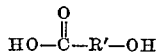

wherein the substituents R' are each valued as designated hereinabove.

In the first step (a) of the process used to make the new biocides, the carbinol group of the starting compound is esterified and a new compound having at least one free carboxyl group is formed. The reagent used to effect this is one of the formula

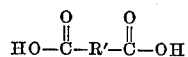

or an anhydride thereof, wherein R' is as aforesaid. All of the contemplated reagents for carrying out this step are freely available or can be prepared readily. Especially useful in this step is maleic anhydride, in which R' is ethylenylene. The esterification step can be carried out simply by mixing and heating the reactants. The temperature required for esterification is not critical; it is convenient to heat the reaction mixture between about 60° C. and about 200° C. With maleic anhydride and the other anhydrides, no water is evolved on esterification, but the progress of the reaction can easily be followed by standard techniques, such as titration of the reaction mixture. On the other hand, if acids are used as the starting materials, the progress of the esterification can be followed by observing the formation of water of reaction. The reaction is substantially complete when the water has ceased to be evolved.

Step (b) of the preparative process involves forming a metallic derivative of the compound of step (a), which contains at least one free carboxyl group. The formation of the metal carboxylate can be carried out by reacting the organotin carboxylate of the second step with a metal salt, a metal carboxylate or even an organometallic derivative such as phenyl mercuric hydroxide.

The reagents contemplated to be employed for this step are derived from mercury, lead, bismuth, silver, copper, cadmium, arsenic, antimony, tin, and germanium. They are freely available commercially or can be readily prepared by those skilled in the art. The anionic groups associated with the cationic form of the metal represent radicals capable of reacting with carboxyl groups to form a carboxylate bond between the metal and the free carboxyl group. Illustrative of such radicals are hydroxyl, oxido, halide, carbonate, and carboxylate. Illustrative of such compounds are: phenylmercuric hydroxide, mercuric acetate, silver oxide, diphenyllead diacetate, diphenylbismuth acetate, triphenyllead hydroxide, diethylantimony acetate, isooctylbismuth diacetate, triphenylbismuth carbonate and others to be illustrated in the examples.

In addition to the new biocides, this invention contemplates a composition susceptible to microbial attack containing a biocidal amount of a compound as defined in claim 1. A "biocidal amount" of the new compounds has been found to be from about 0.0025 to about 1.0 percent by weight. Illustrative of the new compositions are paints, plastics, waxes, adhesives, and the like.

This invention contemplates, in one of its embodiments, paint compositions containing from about 0.01 to about 1.0% by weight of the new biocides, as defined above. These paints provide films resistant to supporting the growth of microorganisms, especially fungi. It is a matter of common knowledge and experience that almost all paint films are subject to disfigurement and destruction by fungi if used under conditions which favor their growth. These conditions are very commonly found in breweries, bakeries, and dairies. Special problems also are noted in certain areas of the world where the climates are characterized by high humidities and temperatures. Thus, in the southern United States, in the West Indies, in West Africa, in Malaya and in the East Indies, and especially in India during the monsoon season, fungus growth on paint is a very serious problem. Among the paints which can be protected against fungus growth by adding the biocides of this invention are "oil-base paints," which contain drying oils, either present as such or combined in resins. There is also contemplated the protection of emulsion paints; these are well known to serve as a vigorous growth media for fungi.

Paints and films can be protected by adding special ingredients which will prevent the growth of fungus in them. Among the substances which have been suggested in the art are organic mercurials, chlorinated phenols and sulfur-containing materials. The mercury compounds, while quite efficient, are exceedingly poisonous and great care must be taken in using them. The instant compounds offer the substantial advantage of providing good protection against the unwanted growth of microorganisms, and are significantly less toxic in the concentrations embodied than the commonly employed mercurials.

The new paint compositions of this invention can be prepared by techniques well within the capabilities of those skilled in the art. The biocides prepared as described in the examples to follow may be added to the paint after it is formulated, or they may be added during the preparation of the paint. It is especially convenient to grind the biocide with the pigment and a small amount of vehicle to insure complete and ready dispersion throughout the mixture. However, especially when small batches of paint are to be prepared, the biocides of the instant invention are conveniently stirred into the paint composition already mixed. The new compositions provide paints, especially those prepared by emulsion techniques, with substantially enhanced resistance to deterioration during storage. Here, the paint resists microorganism attack and growth in the can and, when applied as a coating, the resistance remains.

With respect to the amounts of biocide to be used in the paint to provide the desired antimicrobial effect, it has been found that from about 0.01 to 1.0% by weight provides effective control. Below about 0.01%, there is a tendency for growth to occur, especially under severely adverse conditions of temperature and humidity. While the paint is effectively stabilized above 1.0%, there does not appear to be a sufficient improvement in stability at increasing levels to justify the cost of adding more biocide. The compounds of this invention are especially effective at about 0.25% by weight of the paint composition. Among the deleterious fungi controlled by the instant biocides at these concentrations are *A. niger* and *P. funiculosum*. The instant biocides function effectively in alkyd enamels, of the white architectural type, and in latex paints, of the type disclosed in volume 9, "Encyclopedia of Chemical Technology," Interscience, New York, 1952, pages 774 and 802. Other illustrative paint formulations may be found in volume 11, "Chemical Formulary," Chemical Publishers, New York, 1961, pages 223 and 225.

This invention contemplates, in one of its embodiments, plastics compositions containing from about 25 to about 1000 parts by weight of a biocide as defined herein above per million parts of plastic. It is well known that plastics compositions, especially those highly loaded with plasticizers, are subject to microbial attack, under adverse conditions. For example, plasticized polyvinyl chloride shower curtains, which regularly are exposed to conditions of elevated temperatures and high humidity, often suffer from the growth of fungi and other microorganisms. This causes development of atypical odors and colors. It has now been found that, through the incorporation of a minor amount of the instant biocide into the plastics composition, there is imparted substantial resistance to the growth of these microorganisms. Here, one of the advantages in using the instant compounds resides in the relative decrease in toxicity when compared to the exceedingly poisonous prior art stabilizers, among which might be mentioned is phenylmercuric acetate.

The stabilized plastic compositions can be formulated and compounded by techniques known to those skilled in the art. For example, if a plasticized polyvinyl chloride resin is to be prepared, the instant biocides can be mixed well with the powdered resin; this mixture then can be added to the plasticizers, and the entire formula, which may contain heat and light stabilizers as well, may be homogenized and cast into films. These typically would be useful in shower curtains and in other plastic compositions where microorganism growth is a problem. In addition to polyvinyl chloride, other illustrative plastics are polyolefins, such as, polyethylene, polypropylene, polyvinylidene chloride, copolymers thereof, and the like. With respect to the amount of biocide to be employed, excellent stabilization has been found to be provided in the ranges of from about 25 parts per million to about 1000 parts per million by weight, based on the amount of plastic in the formulation. Below about 25 parts per million, there is a tendency for some microorganisms to grow, especially under adverse conditions, and above 100 parts per million, while growth is very effectively inhibited, there appears to be no economic advantage gained in increasing the amount employed. It is especially preferred, for reasons of economy, low toxicity and high effectiveness, to employ about 250 parts per million by weight of the instant biocides, based on the plastic.

The instant invention contemplates also in one of its embodiments wax compositions containing from about 50 to about 500 parts per million by weight of a biocide, as defined hereinabove. Biocides used for the purpose of providing floor waxes with high resistance to the growth of microorganisms are known as "sanitizers." These find special utility in areas where it is needed to keep organisms under strict control, such as in hospitals. Standards have been set for the performance of materials intended as biocides, especially for vinyl emulsion floor waxes for use in hospitals and nurseries. A typical standard is described as an "Official Use Dilution Method" by Ortenzio and Stuart, in vol. 44, Journal of the Association of Official Agricultural Chemists, page 416 (1961). When the instant biocides are added to typical vinyl emulsion floor waxes, and tested according to the standard, they are found to kill test microorganisms exposed to the waxed film. It is found that the instant biocides function effectively over the ranges of from about 50 parts per million to about 500 parts per million by weight, based on the wax composition. Below about 50 parts per million by weight, some especially resistant organisms show a tendency not to be completely killed, and above 500 parts per million by weight, while the organisms are completely killed, there does not appear to be an economic benefit associated with increasing the amount of sanitizer used. Especially effective results are obtained at 250 parts per million by weight of the instant biocides, based on the wax composition. For example, at this level, 100% kill of the test microorganisms is accomplished in 99% of the tests performed in a 10-minute exposure period using as the biocide a compound prepared according to this invention (Example I).

The wax compositions stabilized with the instant biocides can be prepared by means well within the capabilities of those skilled in the art. It is especially convenient simply to add the instant biocides to the floor wax compositions, which ordinarily contain about 40% solids, emulsified in water, as a last step. On the other hand, when it is desired to prepare large batches, it may be more convenient to dry blend the instant biocides with the wax in powdered form to insure uniform dispersion. Illustrative of the wax polymers stabilized according to this invention are polyvinyl chloride, polyacrylates, polymers and copolymers of ethylenically-unsaturated monomers, natural waxes, and the like.

In still another embodiment, this invention contemplates an adhesive composition containing from about 0.0025 to about 1.0 percent by weight of a biocide as defined in claim 1. The new adhesives compositions resist the growth of microorganisms. This provides exceptional utility in wallpaper paste, for example, where the growth of mildew and other organisms is a problem, sometimes even causing complete loss of adhesion. In addition, the use of the new compositions in the form of plywood glues provides benefits, especially where the plywood must be used in areas of high temperature and humidities, under which conditions microbial growth is a severe problem.

The biocidal adhesives compositions are readily prepared simply by adding the appropriate amount of the biocide during formulation, or, alternatively, to the final mix. These techniques will be exemplified hereinafter. Detailed procedures for preparing adhesives compositions can be found in Braude, "Adhesives," Chemical Publishing Company, New York, 1943.

The following examples are illustrative of the new compounds and compositions of the instant invention. They are not intended to be construed as limiting the invention in any manner whatsoever.

EXAMPLE I

Biocidal reaction product from tributyltin hydroxyacetate maleic anhydride and phenylmercuric hydroxide To 59.6 g., 0.1 mole of bis-tributyltin oxide there is added 15.2 g., 0.2 mole, of hydroxyacetic acid and the mixture is heated to 120° C. until the water of reaction ceases to be evolved. To 36.5 g. of tributyltin hydroxyacetate thus formed is added 9.8 g., 0.1 mole of maleic anhydride and the mixture is heated, with stirring, at 100° C. for 30 minutes to provide a second reaction product. Then 29.4 g., 0.1 mole, of phenylmercuric hydroxide is added and the mixture is heated to 100° C. for 5 minutes. The mixture is cooled to room temperature and the biocidal product is recovered as solid.

EXAMPLE II

Biocidal reaction product from tributyltin hydroxyacetate, maleic anhydride and silver oxide To 9.3 g., 0.02 mole, of tributyltin hydroxyacetate is added 1.96 g., 0.02 mole of maleic anhydride and the mixture is heated, with stirring, at 100° C. for 30 minutes to provide a second reaction product. Then 4.6 g., 0.02 mole of silver oxide is added and the mixture is heated to 100° C. for 5 minutes. The mixture is cooled to room temperature and the biocidal product is recovered as a solid.

EXAMPLE III

The procedure of Example I is repeated substituting for the phenylmercuric hydroxide, stoichiometrically equivalent amounts of the following metal salts: mercuric acetate, lead acetate, bismuth acetate, cadmium acetate and antimony acetate. Highly effective biocides are obtained containing tin and, respectively, mercury, lead, bismuth, copper, cadmium and antimony.

EXAMPLE IV

Biocidal reaction product from bis-tributyltin oxide, mercaptoethanol, maleic anhydride and phenylmercuric hydroxide To 59.6 g., 0.1 mole, of bis-tributyltin oxide is added 15.6 g., 0.2 mole, of mercaptoethanol and the reaction mixture is heated to 120° C., with thorough stirring to drive off the water of reaction. To 0.1 mole of the resulting tributyltin β-hydroxyethyl mercaptide is added 9.8 g., 0.1 mole, of maleic anhydride and the mixture is heated at 80–90° C. for 30 minutes to form a first reaction product. This is treated with 29.4 g., 0.1 mole, of phenylmercuric hydroxide and heated to 110° C. for 15 minutes. After cooling the mixture to 25° C., there is obtained the biocidal product as a light brown oil. It is a very effective antimicrobial agent.

EXAMPLE V

The procedure of Example IV is repeated substituting for the phenylmercuric hydroxide, stoichiometrically equivalent amounts of the following metal salts: mercuric acetate, lead acetate, bismuth acetate, cadmium acetate and antimony acetate. Highly effective biocides are obtained containing tin and, respectively, mercury, lead, bismuth, copper, cadmium and antimony.

EXAMPLE VI

Organotin hydroxy acid ester starting materials are prepared by heating 0.1 mole of a tin compound of the formula

with 0.2 mole of a hydroxy carboxylic acid of the formula

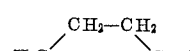

at 120° C. until the water of reaction ceases to be evolved.

Sulfur-containing organotin carbinol starting materials are prepared by heating 0.1 mole of the tin compounds designated $(R_3Sn)_2O$, above, with 0.2 mole of a mercapto-alcohol of the formula heating and stirring the mixture at 100° C. for 30 minutes to provide a first reaction product, containing an ester linkage, and a free carboxyl group and heating the first reaction product with an equimolar amount of a metal carboxylate forming compounds of the formulas:

$$CdW_2$$

$$W$$
$$\overline{\begin{matrix}Cl\\Br\\I\end{matrix}}$$

Metal $[X]_n$

| Metal | X | n |
|---|---|---|
| Ag+ | [O] | ½ |
| Cu+ | OH | 1 |
| Cu+ | [O]1/2 | 1 |
| Cu+ | OCOCH₃ | 1 |
| Cu+ | OCH₂CH₃ | 1 |
| Cu++ | OCO(CH₂)₁₇CH₃ | 2 |
| Cu++ | OCO—⌬ | 2 |
| Cu++ | OCO—CH⟨CH₂—CH₂⟩CH₂ / CH₂—CH₂ CH₂ | 2 |
| Ag+ | [—OC(=O)—O—] | ½ |
| Ag+ | OCOCH₃ | 1 |

$$HS-R'-OH$$

| R' | R | R' |
|---|---|---|
| —CH₂— | —CH₂—CH=CH—CH₂— | —⌬— |
| —CH₂CH₂— | —CH₂—C≡C—CH₂— | —⌬—CH₃ |
| —CH₂(CH₂)₂CH₂— | —CH⟨CH₂—CH₂⟩CH / CH₂—CH₂ | —⌬⌬— |
| —CH₂(CH₂)₁₆CH₂— | —CH⟨CH—CH⟩CH— / CH₂—CH₂ | |
| —CH[CH₂(CH₂)₁₄CH₃]CH₂— | | | at 120° C. until the water of reaction ceases to be evolved.

Biocidal compounds are prepared by adding to the starting materials an equimolar amount of an acid of the formula $$HO-\overset{O}{\underset{\|}{C}}-R'-\overset{O}{\underset{\|}{C}}-OH$$

| R' | R' | R' |
|---|---|---|
| —CH=CH— | —C≡C— | ⌬—CH₂— |
| —CH₂CH₂— | —CH₂—C≡C—CH₂— | —⌬⌬— |
| —CH₂(CH₂)₂CH₂— | —CH⟨CH₂—CH₂⟩CH / CH₂—CH₂ | |
| —CH₂(CH₂)₁₆CH₂— | —CH⟨CH=CH⟩CH / CH₂—CH₂ | |
| —CH[CH₂(CH₂)₁₄CH₃]CH₂— | | —⌬— |
| —C(CH₃)=CH— | | |

| Metal | R | m | Y | n |
|---|---|---|---|---|
| $Hg_2^{++}$ | | 0 | Cl | 2 |
| $Hg^{++}$ | | 0 | Cl | 2 |
| $Hg^{++}$ | | 0 | $OCH_2CH_3$ | 2 |
| $Hg^{++}$ | phenyl | 1 | OH | 1 |
| $Hg^{++}$ | $CH_3$ | 1 | OH | 1 |
| $Hg^{++}$ | | 0 | $OCOCH_3$ | 2 |
| $Hg^{++}$ | benzyl ($C_6H_5CH_2$) | 1 | $OCOCH_2(CH_2)_{15}CH_3$ | 1 |
| $Hg^{++}$ | $CH_3(CH_2)_{16}CH_2$ | 1 | OCOCH(cyclohexyl) | 1 |
| $Hg^{++}$ | $HC\equiv C-CH_2-$ | 1 | $OCO$-phenyl | 1 |
| $As^{+++}$ | phenyl | 1 | Cl | 2 |
| $As^{++++}$ | cyclohexenyl | 3 | OH | 2 |
| $As^{+++}$ | $CH_3CH_2-$ | 3 | | 0 |
| $As^{++++}$ | $C_6H_5CH_2-$ | 2 | $OCOCH_3$ | 3 |
| $Sb^{+++}$ | cyclohexenyl | 1 | Br | 2 |
| $Sb^{+++++}$ | $CH_3(CH_2)_{11}$-phenyl | 3 | I | 2 |
| $Sb^{+++}$ | phenyl-$CH_2(CH_2)_{10}CH_2-$ | 3 | | 0 |
| $Sb^{+++++}$ | $CH_3CH=CH-CH_2-$ | 2 | $OCOCH=CH_2$ | 3 |
| $Bi^{+++}$ | phenyl | 1 | Cl | 2 |
| $Bi^{++++}$ | cyclohexenyl | 3 | OH | 1 |
| $Bi^{+++}$ | $CH_3CH_2-$ | 3 | | 0 |
| $Bi^{+++}$ | $C_6H_5CH_2-$ | 2 | $OCOCH_3$ | 2 |
| $Ge^{++++}$ | phenyl | 1 | OH | 3 |
| $Ge^{++++}$ | cyclohexenyl | 2 | $[-OCO-]1/2$ | 2 |
| $Ge^{++++}$ | $CH_3CH_2-$ | 3 | Cl | 1 |
| $Ge^{++++}$ | | 0 | $OCOCH_3$ | 4 |
| $Sn^{++}$ | | 0 | Cl | 2 |
| $Sn^{++++}$ | phenyl | 3 | OH | 1 |
| $Sn^{++++}$ | cyclohexenyl | 2 | $[-OCO-]1/2$ | 2 |
| $Sn^{+++}$ | $CH_3CH_2-$ | 3 | Cl | 1 |
| $Sn^{+++}$ | | 0 | $OCOCH_3$ | 4 |

| Metal | R | m | Z | n |
|---|---|---|---|---|
| Pb++ | | 0 | [—O—SO—O—]1/2 | 2 |
| Pb++ | | 0 | Cl | 2 |
| Pb++++ | ⟨phenyl⟩—CH₂ | 2 | OCOCH₃ | 2 |
| Pb++++ | ⟨phenyl⟩— | 3 | OH | |
| Pb++++ | 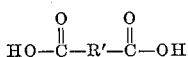 | 2 | [—OC(=O)—O]1/2 | 2 |
| Pb++ | | 0 | OCOCH₃ | |
| Pb++++ | CH₃(CH₂)₁₆CH₂— | 3 | [—O—]1/2 | |
| Pb++++ | cyclic CH₂-CH₂-CH-CH₂-CH₂-CH₂ | 4 | | |

[R]$_m$ Metal [Z]$_n$ and heating the mixture to 110° C. for 30 minutes, then cooling to room temperature (20° C.).

The procedure is repeated, substituting for the acid of the formula $$HO-\overset{O}{\underset{\|}{C}}-R'-\overset{O}{\underset{\|}{C}}-OH$$

stoichiometrically equivalent amounts of the corresponding anhydrides. Substantially the same results are obtained.

The procedure is repeated, except that the first reaction product is heated with the metal carboxylate forming compound at 20° C. and at 150° C., instead of at 110° C. Substantially the same results are obtained.

EXAMPLE VII

A latex paint is prepared having the following composition:

| | Lbs. |
|---|---|
| Titanium dioxide | 47.4 |
| Styrene-butadiene copolymer latex (50% solids) | 22.9 |
| Starch solution (15% solids) | 20.4 |
| Tetrasodium pyrophosphate | 1.4 |
| Silicone antifoam agent | 0.01 |
| Water | 7.6 |
| | 99.71 |

The pigment is mixed with starch solution (prepared by heating starch in water at 185° F.), tetrasodium pyrophosphate and enough water to form a paste, first in a heavy duty mixer, and then is ground on a 3-roll paint mill. The remaining ingredients, latex, antifoam and water, then are mixed into the pigment dispersion. To the paint is added 0.25% by weight of the biocide of Example I. The biocidal activity imparted to the paint is demonstrated by coating a filter paper disc with the product, allowing it to dry, laying it face down on an agar plate inoculated with the test organisms and measuring the growth inhibition zones. With both *A. niger* and *P. funiculosum* as the test organism, the zone sizes were 16 mm., measured from the edge of the paper to the edge of the growing organism. When 0.01% by weight of the biocide of Example I is added to the paint, the zone of inhibition is somewhat smaller; when 1.0% by weight is used the zone of inhibition is somewhat larger. When no biocide is added, in control experiments, there is no inhibition of microorganism growth.

EXAMPLE VIII

An oil based alkyd enamel is prepared having the following composition:

| | Lbs. |
|---|---|
| Titanium dioxide | 300 |
| Zinc oxide pigment | 25 |
| Long-oil soya alkyd (60% solids) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| | 994 |

The titanium dioxide, zinc oxide, naphthenates and enough of the biocide of Example I to provide 0.25% by weight based on final weight of the paint are milled until smoothly dispersed. The remaining ingredients are added and the paint is blended on a 3-roll mill until homogeneous. Filter paper discs are coated, dried and laid face down on agar plates inoculated with *A. niger* and with *P. funiculosum*. After incubation zones of inhibition were observed measuring 11 and 10 mm., respectively, from the edge of the paper to the edge of the growing organism. The procedure is repeated with biocide levels of 0.01 and 1.0% by weight, based on the paint, and zones of inhibition are observed. In the absence of biocide, microbial growth is not retarded.

EXAMPLE IX

Paints with biocidal properties are prepared by adding, respectively, 0.01, 0.25 and 1.0% by weight based on the paint of the compounds of Examples I, IV and VI to the paints of Examples VII and VIII.

EXAMPLE X

A plastisol film is prepared having the following formulation:

| | Parts |
|---|---|
| Polyvinyl chloride plastic | 100 |
| Dioctyl phthalate plasticizer | 50 |
| Dibutyltin didodecylmercaptide stabilizer | 2 |

The biocide of Example I is added at 25, 100, 200, 250, and 1000 parts per million based on the plastic. The biocide is ground in a mortar and pestle then mixed with the plastic in a blending machine. The other ingredients are added and the mixtures are melted, then cast into films of about 0.060 inch thickness. The films are cured for 5 minutes at 180° C., then are cut into discs 12.7 mm. in diameter. They are laid on agar plates previously inoculated with *P. funiculosum* test organisms. After incubation the total diameter of the zones of inhibition are measured. With 100 and 200 p.p.m. of biocide zones measuring 25 and 35 mm., respectively, are observed. With 25, 250 and 1000 p.p.m., good inhibition is seen. The untreated plastic films did not inhibit the growth of this organism.

EXAMPLE XI

Plastics compositions with biocidal properties are prepared by adding, respectively, 25, 100, 200, 250 and 1000 p.p.m., respectively, based on the weight of plastic of the compounds of Examples I, IV and VI to the plastisol of Example X.

EXAMPLE XII

To a vinyl emulsion floor wax, containing 40% by weight of polyvinyl chloride, is added 250 p.p.m. of the biocide of Example I. The germicidal activity of the resulting sanitizing wax is measured by the official use dilution method described by Ortenzio and Stuart in volume 44, Journal of the Association of Official Agricultural Chemists, page 416 (1961). At this level, 100% kill of the test microorganisms is accomplished in 99% of the tests performed in a ten minute exposure period. The biocide is effective when added also at levels of 50 and 500 p.p.m. by weight based on the floor wax.

EXAMPLE XIII

Floor waxes with biocidal properties are prepared by adding 50, 250 and 500 p.p.m. by weight based on the wax composition of the compounds of Examples I, IV and VI and testing them according to the method cited in Example XII.

EXAMPLE XIV

A casein-based plywood glue is prepared by adding one part of the biocide of Example I, in finely powdered form, to 100 parts of powdered casein then soaking and stirring the mixture in 250 parts of water for one hour. Ten parts of calcium hydroxide is dissolved in 100 parts of water and the solution is added to the swollen casein. To the mixture is added 15 parts of sodium silicate and the paste is stirred for 10 minutes. There is obtained a glue for plywood, which is highly resistant to the growth of microorganisms. The biocide is effective also when added at levels of 0.0025 percent and 1.0 percent by weight based on the weight of the glue.

EXAMPLE XV

A cold water paste for paper hanging is prepared by blending 0.45 lb. of the biocide of Example I, in finely powdered form with 40 lbs. of potato starch. Thirty-four pounds of calcium chloride is dissolved in 2 gallons of water and the starch-biocide mixture is added slowly to form a paste, which is dried and ground. This adhesive composition, when mixed with water and used to hang wallpaper, provides resistance to the growth of microorganisms. Adhesive compositions with antimicrobial properties are also obtained when 0.0025 percent and 0.5 percent by weight of the biocide is used.

EXAMPLE XVI

Adhesives compositions with biocidal properties are obtained by adding 0.0025, 0.5 and 1.0 percent by weight of the compounds of Examples I, IV and VI to the compositions of Examples XIV and XV.

What is claimed is:

1. A composition effective against microbial attack comprising a mixture of (1) a biocidal amount of the product prepared by:
   (a) heating, at esterification temperature, an organotin carbinol of the formula $$[R]_3Sn\text{---}G\text{---}R'\text{---}OH$$

wherein R is a hydrocarbon substituent selected from the group consisting of alkyl, alkenyl, alkynyl, cycloalkyl, cycloalkenyl, aryl and alkaryl of up to 18 carbon atoms; G is selected from the group consisting of divalent radicals of the formula ---S--- and $$\text{---O---}\overset{\overset{\displaystyle O}{\|}}{C}\text{---}$$

R' is a hydrocarbon substituent selected from the group consisting of alkylene, alkenylene, alkynylene, cycloalkylene, cycloalkenylene, arylene, and alkarylene of up to 18 carbon atoms, with at least an equimolar amount of a compound selected from the group consisting of those of the formula $$\text{HO---}\overset{\overset{\displaystyle O}{\|}}{C}\text{---R'---}\overset{\overset{\displaystyle O}{\|}}{C}\text{---OH}$$

and anhydrides thereof until formation of an ester linkage is substantially complete, at least one free carboxyl group per molecule remaining, and
   (b) heating the organotin carboxylic acid formed in step (a) with at least an equimolar amount of a carboxylate-forming cation-containing reagent selected from the group consisting of those of the formulas $CdW_2$; $AgX$; $CuX$; $CuX_2$; $[R]_mHg[Y]_n$, $m$ being 0, 1, $n$ being 1, 2; $[R]_mBi[Y]_n$, $[R]_mSb[Y]_n$ and $[R]_mAs[Y]_n$, $m$ being 1, 2, 3, $n$ being 0, 1, 2, 3, 4; $[R]_mSn[Y]_n$ and $[R]_mGe[Y]_n$, $m$ being 0,1,2,3, $n$ being 1, 2, 3, 4; and $[R]_mPb[Z]_n$, $m$ being 0, 1, 2, 3, 4, $n$ being 0, 1, 2, 3, 4, the sum of $m$ and $n$ being equal to the valency state of the cation, wherein W is a halide selected from the group consisting of chloride, bromide and iodide; X is an anion selected from the group consisting of ---OH, $[\text{---O---}]^{1/2}$ $$\text{---O---}\overset{\overset{\displaystyle O}{\|}}{C}\text{---R}$$

$[\text{---O---C---O---}]^{1/2}$ and ---OR; Y is an anion selected from the group consisting of those designated X and W; and Z is an anion selected from the group consisting of Y and $$[\text{---O---}\overset{\overset{\displaystyle O}{\|}}{S}\text{---O---}]^{1/2}$$

and wherein R is as aforesaid, at a temperature of from about 20° C. to about 150° C. until carboxylate formation is substantially complete; and
   (2) a medium selected from the group consisting of oil and water-base paints, plastics based on ethylenically-unsaturated monomers, natural and synthetic waxes and starch and proteinaceous base adhesives.

2. A composition as claimed in claim 1 wherein said medium is a paint and said biocidal amount of the product is from about 0.01 to about 1.0 percent by weight of the total mixture.

3. A composition as claimed in claim 1 wherein said medium is a plastic and said biocidal amount of the product is from about 25 to about 1000 parts by weight per million parts of plastic.

4. A composition as claimed in claim 1 wherein said medium is a wax and said biocidal amount of the product is from about 50 to about 500 parts by weight per million parts of wax.

5. A composition as claimed in claim 1 wherein said medium is an adhesive and said biocidal amount of the product is from about 0.0025 to about 1.0 percent by weight of the total mixture.

References Cited

UNITED STATES PATENTS 3,214,279 10/1965 Scott _____ 106—15
3,236,793 2/1966 Robins et al. _____ 106—15 XR JULIUS FROME, *Primary Examiner.*

L. HAYES, *Assistant Examiner.*

U.S. Cl. X.R.

106—146, 213, 253, 271; 260—29.6, 41; 424—288